US010334783B2

(12) United States Patent
Walker et al.

(10) Patent No.: US 10,334,783 B2
(45) Date of Patent: Jul. 2, 2019

(54) STALK ROLL FOR AGRICULTURAL ROW UNIT

(71) Applicant: CNH Industrial America LLC, New Holland, PA (US)

(72) Inventors: Eric L. Walker, Narvon, PA (US); Brian P. Crow, Rock Island, IL (US); Dariusz Adamczyk, Plock (PL); Eric Fredricks, Davenport, IA (US); Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/248,067

(22) Filed: Aug. 26, 2016

(65) Prior Publication Data

US 2018/0054968 A1    Mar. 1, 2018

(51) Int. Cl.
*A01D 45/02* (2006.01)
*A01D 61/00* (2006.01)

(52) U.S. Cl.
CPC ......... *A01D 45/021* (2013.01); *A01D 45/025* (2013.01); *A01D 61/008* (2013.01)

(58) Field of Classification Search
CPC .... A01D 45/02; A01D 45/021; A01D 45/023; A01D 45/025; A01D 61/006; A01D 61/008; A01D 65/04
See application file for complete search history.

(56) References Cited

U.S. PATENT DOCUMENTS

| 335,170 | A | | 2/1886 | Wolf |
| 747,263 | A | | 12/1903 | Streitwieser |
| 787,750 | A | | 4/1905 | Goodhue |
| 839,472 | A | * | 12/1906 | Goodhue ............. A01D 45/025 460/27 |
| 1,123,806 | A | * | 1/1915 | Rupp ................... A01D 45/025 460/27 |
| 1,240,847 | A | | 9/1917 | Hibbs |
| 2,634,731 | A | | 4/1953 | Karlsson |
| 4,720,965 | A | | 1/1988 | Manor et al. |
| 9,386,747 | B2 | * | 7/2016 | Madheswaran ........ A01D 91/04 |
| 2009/0025353 | A1 | * | 1/2009 | Christensen .......... A01D 45/025 56/94 |
| 2012/0047865 | A1 | * | 3/2012 | Lohrentz ............. A01D 45/021 56/113 |
| 2015/0319926 | A1 | * | 11/2015 | Madheswaran ........ A01D 91/04 56/104 |
| 2016/0007533 | A1 | | 1/2016 | Palmute |
| 2017/0172067 | A1 | * | 6/2017 | Calmer ................ A01D 45/025 |
| 2017/0311542 | A1 | * | 11/2017 | Ehle ..................... A01D 45/025 |

FOREIGN PATENT DOCUMENTS

| EP | 2018801 A1 | 1/2009 |
| FR | 1362694 A | 6/1964 |
| WO | 2016118659 A1 | 7/2016 |

* cited by examiner

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

An agricultural harvester row unit has side-by-side stalk rolls oriented to receive crop stalks. Each of the stalk rolls have a forward section with an annular base tapered towards the forward end and spiral auger flights that overlap one another and cooperate with adjacent bases to positively move crop stalks in an aft direction.

10 Claims, 1 Drawing Sheet

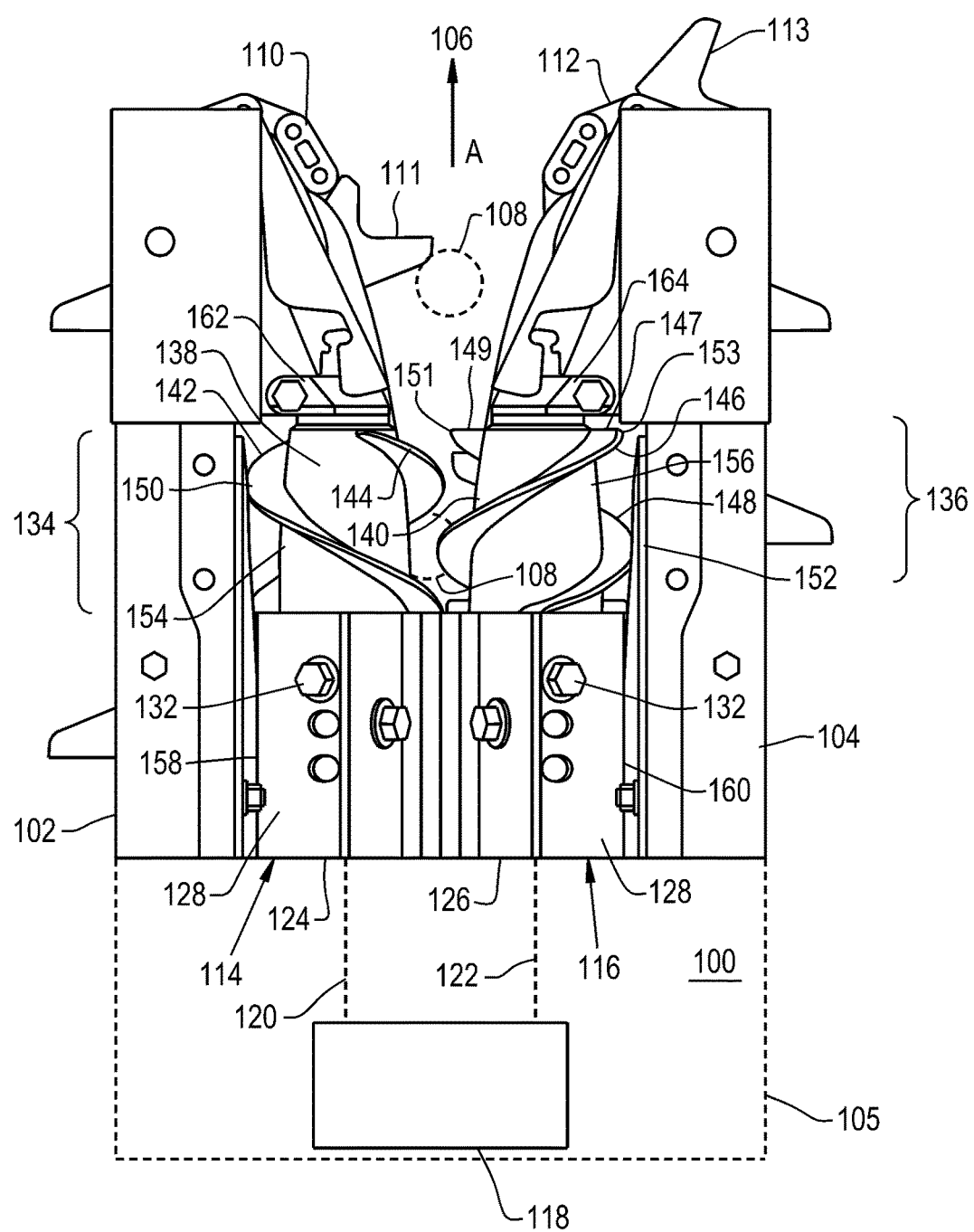

STALK ROLL FOR AGRICULTURAL ROW UNIT

FIELD OF THE INVENTION

The present invention relates to agricultural row units, and, more particularly, to stalk rolls used in such units.

BACKGROUND OF THE INVENTION

The crop harvesting process, particularly when dealing with row crops having significant stalks, such as corn, requires a severing of the ear from the stalk and further processing by an agricultural harvester. The agricultural harvester typically includes a plurality of row units positioned in line with the expected row spacing of the crop. As the agricultural harvester moves through the field, the stalk with the agricultural crop is moved to a pair of counter rotating stalk rolls where the stalk is pulled downward to sever the agricultural crop from the stalk. The stalk rolls are usually cylinders arranged to rotate about axes extending in a fore and aft direction and a plurality of either flutes or blades extending radially from the cylinders to grip the stalk and pull it downward, to sever the agricultural crop from the stalk for further processing.

An important component of the stalk roll is the forward or entry section which acquires the stalk and guides it aft to the blades as the row unit is moved forward. Typical row units incorporate gather chains and an annular, conical or tapered base with one or more spiral flutes. A pair of side-by-side stalk rolls have the spiral flutes arranged so that they work together to direct the stalk toward the blades. A problem, however, with current designs is that the auger spiral flights are shallow and have a significant gap therebetween at the initial entry to the stalk rolls. This can allow misalignment and improper capturing of the stalk.

What is needed in the art therefore, is a row unit with stalk rolls that provide a positive and secure transfer of stalks into the stalk roll for processing.

SUMMARY OF THE INVENTION

In accordance with an aspect of the present invention, there is provided an agricultural harvester row unit driven in a forward direction to receive crop stalks. The row unit includes a pair of rotatable side-by-side stalk rolls oriented longitudinally fore and aft relative to the forward direction. A device powers the stalk rolls in counter rotating directions. The stalk rolls each have a forward section with an annular base tapered towards the forward end of the stalk roll and at least one spiral auger flight on the annular base having an outer diameter that overlaps the outer diameter of an adjacent flight from the rearward end of said annular base at least as far forward as approximately the longitudinal midpoint of the annular base.

An advantage of the row unit described herein is that stalks are positively captured and fed into the crop stalk rolls.

Another advantage of the row unit described herein is that stalks are fed to the stalk rolls without damage to the stalk.

BRIEF DESCRIPTION OF THE DRAWINGS

The above-mentioned and other features and advantages of this invention, and the manner of attaining them, will become more apparent and the invention will be better understood by reference to the following description of an exemplary embodiment of the invention taken in conjunction with the accompanying drawing, wherein:

FIG. 1 is a plan view of a row unit, in accordance with an exemplary embodiment of the present invention.

Corresponding reference characters indicate corresponding parts throughout the view. The exemplification set out herein illustrates one embodiment of the invention and such exemplifications is not to be construed as limiting the scope of the invention in any manner.

DETAILED DESCRIPTION OF THE INVENTION

Referring now to the drawings, and more particularly to FIG. 1, there is shown an exemplary embodiment of a row unit 100 having left and right frame members 102 and 104 interconnected to the chassis 105 of an agricultural harvester (not shown). The frame members 102 and 104 are moved forward with the agricultural harvester in direction A and have a mouth 106 for capturing a row of stalks 108. For exemplary purposes, the stalk 108 can be a corn stalk in which the ear of corn is removed from the stalk in the row unit 100. To facilitate entry of the stalk 108 into the row unit 100, a left gather chain 110 and right gather chain 112, as viewed in FIG. 1, are provided. They rotate so that projections 111 and 113, respectively move in an aft direction relative to the forward direction A and move the stalks 108 between left stalk roll 114 and right stalk roll 116.

Stalk rolls 114 and 116 are driven by a gear box 118 through mechanical connections 120 and 122 respectively (both shown schematically). The stalk rolls 114 and 116 are mounted for rotation about axes that are substantially parallel to the direction of forward movement A and are driven in counter rotation so that the roll 114 is driven clockwise and roll 116 counterclockwise as viewed from the aft position. The gearbox 118 may also provide a driving force for the gather chains 110 and 112 and is supported by chassis 105.

The stalk rolls 114 and 116 each are formed from longitudinal bases 124 and 126 to which blades 128 and 130 are mounted by fasteners 132. The blades 128 and 130 act to pull the stalk 108 downward in a series of movements as they rotate so as to sever an ear of corn from stalk 108. It should be noted that in other forms, the stalk rolls 114 and 116 may also include flutes in place of the blades 128 and 130.

The stalk rolls 114 and 116 each have a forward portion 134 and 136, respectively. The forward portions 134 and 136 each have a tapered annular base 138 and 140, respectively, which is secured to the forward portion of longitudinal bases 124 and 126, respectively. Annular base 138 has a first auger flight 142 and a second auger flight 144. Tapered annular base 140 has a first auger flight 146 and a second auger flight 148. As stated above, the stalk rolls 114 and 116 rotate in counter rotating fashion. The outer diameter 150 of the auger flights on the tapered annular base 138 and the outer diameter 152 of the first and second auger flights 146 and 148 on tapered annular base 140 are selected so that they overlap from the rear most portion of the tapered annular bases 138 and 140 to at least the longitudinal midpoint of the bases 138 and 140.

Preferably, the overlap is significantly towards the forward most portion of the annular bases 138 and 140. Preferably, the outer diameters of the first and second auger flights on the tapered annular bases 138 and 140 are constant from the rear of the tapered annular bases 138 and 140 to their forward end. Preferably the auger flights have leading
} edges at their forward end. The auger flights 146 and 145 on base 126 have leading edges 147 and 149 respectively. The leading edges 147 and 149 extends substantially perpendicularly relative to the rotational axis of the stalk roll 116 and they extend to the outer diameter 152 of the auger flights. Preferably the leading edges 147 and 149 have a rounded intersection 153 and 151 respectively with the outer diameter 152. In addition, the outer diameter 154 of tapered annular base 138 and the outer diameter 158 of tapered annular base 140 are selected so that in the forward portion of the annular bases 138 and 140, the gap between the outer diameter 154 of the tapered annular base 138 at that point and the outer diameter 152 of the auger flight 146 extending towards the base 138 form a gap that is at least smaller than the expected diameter of a stalk 108. An example of such a gap is approximately ¾ of an inch. The same relationship exists between tapered annular base 140 and the outer diameter 150 of the auger flights 142 and 144. This relationship allows the auger flight and the corresponding annular base to capture the stalk 108 and positively move it towards the aft end of the stalk rolls 114 and 116. In addition, the outer diametral path 158 of blades 128 and the outer diametral path 160 of blades 130 are smaller than the outer diameter of the auger flights on both tapered annular bases 138 and 140.

The support of the aft ends of stalk rolls 114 and 116 is usually provided by gear box 118 interconnected with frames 102, 104 and the forward end is supported by front bearing assemblies 162 and 164 which are in turn connected to frames 102 and 104, respectively.

By selecting the outer diameter of the auger flights to overlap and be greater than the diametral path of the blades 128 and 130, a more positive transport of the stalk 108 is provided in an aft direction for pulling of the stalk to sever the agricultural crop, such as an ear of corn from the stalk. In addition, the gap between auger flights and the adjacent annular base positively holds and guides the stock 108 towards the aft end of the stalk rolls 114 and 116. This results in a more consistent and positive capturing of the stalks 104 for further processing as the row unit is moved in forward direction A.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester row unit driven in a forward direction to receive crop stalks, said row unit comprising:

a pair of rotatable side-by-side stalk rolls in a horizontal plane oriented longitudinally fore and aft relative to the forward direction and having a forward end;

a device for powering said stalk rolls in counter rotating directions;

wherein said stalk rolls each have a forward section with an annular base tapered towards the forward end of said stalk roll and at least one spiral auger flight on said annular base extending radially so that the outer diameter overlaps the outer diameter of an adjacent flight from a rearward end of said annular base significantly towards a forward most portion of said annular base;

wherein the outer diameter of the auger flights are constant from the rearward end of said annular base to the forward end of said annular base; and wherein said at least one auger flight has a leading edge at the forward end thereof, at least a portion of said leading edge adjacent the outer diameter of said at least one spiral auger flight extending perpendicularly relative to the rotational axis of said stalk roll to the outer diameter of said at least one auger flight.

2. The agricultural row harvester unit as claimed in claim 1, wherein the outer diameter of said annular base and the outer diameter of an adjacent flight adjacent the forward end of said stalk roll are selected to provide a gap approximately equal to less than the diameter of a crop stalk.

3. The agricultural harvester row unit as claimed in claim 2, wherein said gap is approximately ¾ of an inch.

4. The agricultural harvester as claimed in claim 1, wherein the intersection between the leading edge of said one auger flight and the outer diameter thereof is rounded.

5. The agricultural harvester row unit as claimed in claim 1, having a plurality of auger flights on each annular base.

6. The agricultural harvester row unit as claimed in claim 5, having two auger flights on each annular base.

7. The agricultural harvester row unit as claimed in claim 1, wherein said forward section is a unitary piece forming the forward section of said stalk roll.

8. The agricultural harvester row unit as claimed in claim 1, further comprising a bearing assembly journaling the forward end of said stalk roll.

9. The agricultural harvester row unit as claimed in claim 1, wherein said stalk rolls each have a cylindrical base and a plurality of outwardly extending blades to generate an outer diametral path and wherein the outer diameter of said spiral auger flights at the end adjacent the forward end of said stalk roll is greater that the outer diametral path of the blades.

10. The agricultural harvester row unit as claimed in claim 1, further comprising a frame and wherein the device for driving said stalk rolls is a gear box supported by said frame and said row unit further comprises gather chains adjacent the stalk rolls for assisting the movement of a crop stalk in an aft direction.

* * * * *